United States Patent Office 3,446,624
Patented May 27, 1969

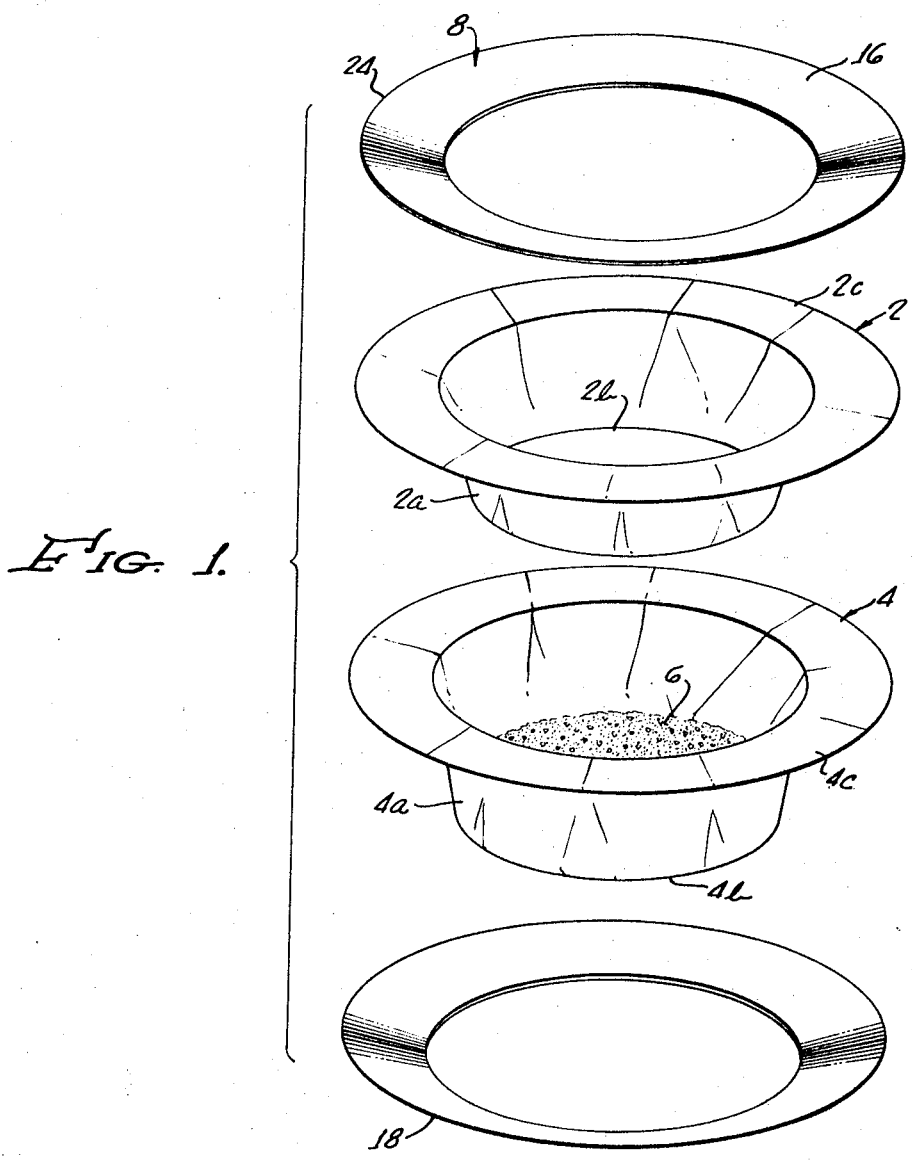
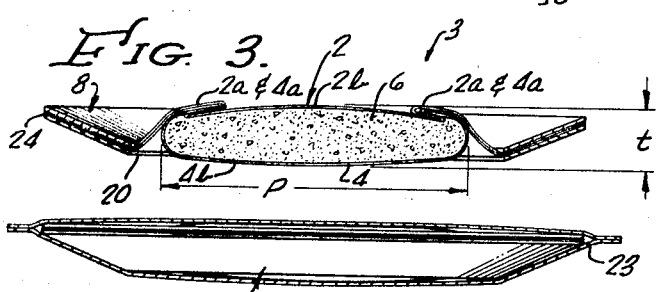

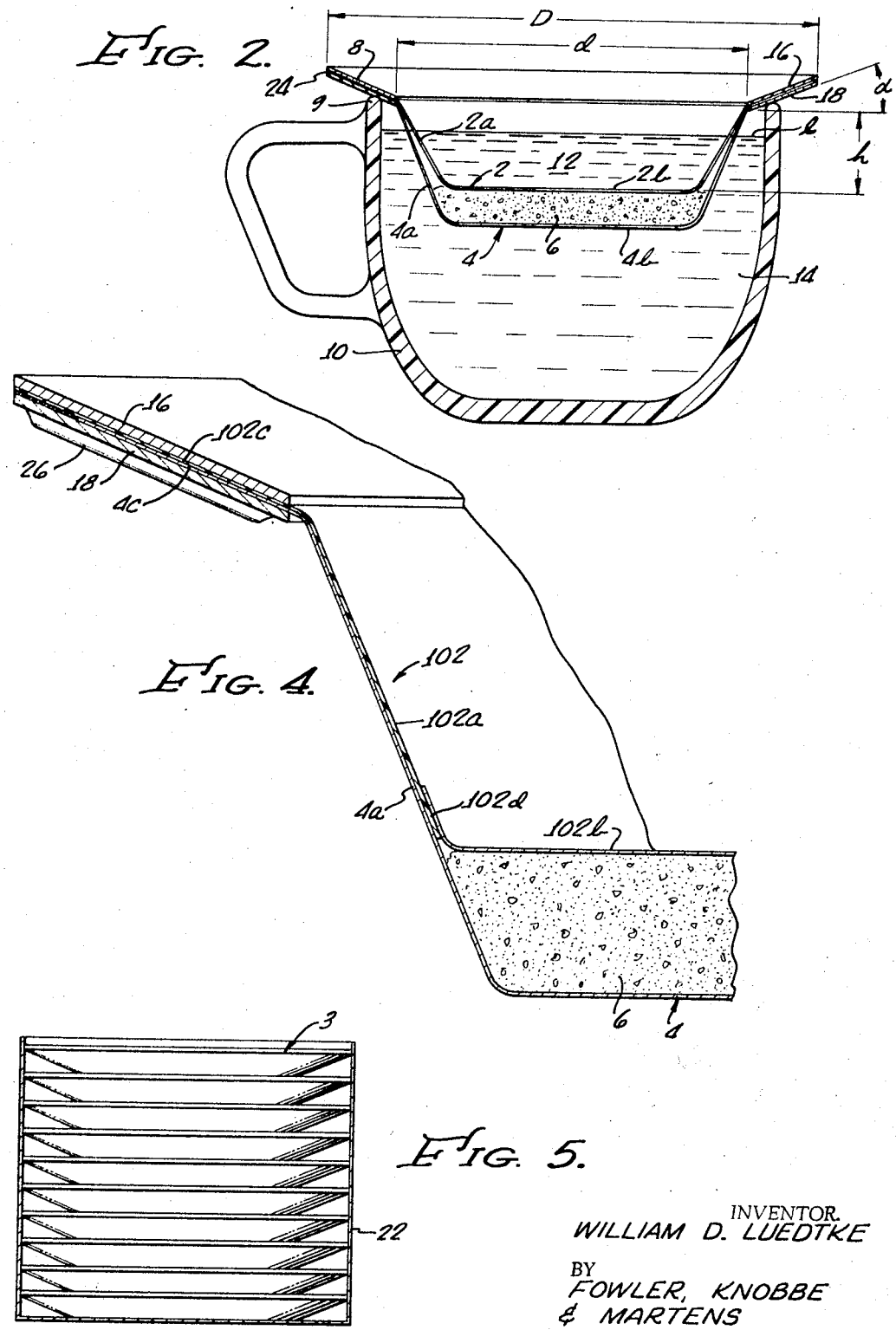

3,446,624
DISPOSABLE COFFEE DRIP BREWER
William David Luedtke, 2689 Canary Drive,
Costa Mesa, Calif. 92626
Filed July 28, 1967, Ser. No. 656,886
Int. Cl. A23f *1/08;* A47j *31/10, 31/08*
U.S. Cl. 99—71                                      16 Claims

ABSTRACT OF THE DISCLOSURE

A disposable device for drip brewing coffee includes a pair of nested filter cups containing ground coffee between the filter bottoms. An annular disc connected to the top of the filter cups is adapted to be supported on the upper lip of a coffee cup to suspend the filter cups in the coffee cup. The upper filter cup forms a reservoir for receiving hot water to be dripped through the filter paper and ground coffee. The side walls of the filter cups are flexible so that the device is collapsed for packaging with the packet of coffee received in the annulus of the disc and the entire device being no thicker than the packet of coffee. In one embodiment, the wall is impervious to water to insure that all of the water passes through the ground coffee. After the packet is extended into a cup by extending the side walls, sufficient water is poured through the filters to bring the level of coffee in the cup above the ground coffee in the packet. The packet can then be left in the beverage to steep until the desired strength is obtained, and can also be oscillated in the beverage to recirculate the liquid coffee through the packet and increase the strength.

Background of the invention

This invention relates to a device for brewing coffee, and more particularly to a throw-away device adapted to instantly drip brew a single cup of coffee.

It is generally recognized that fresh drip brewed coffee is superior in flavor to the various instant coffees currently available on the market. The instant coffees remain very popular, however, because of their convenience, and to some extent in spite of their flavor. Thus, there is a large demand for a competitively priced drip brewing device which is as convenient as the currently available instant coffees.

Numerous attempts have been made in the past to design a suitable disposable, instant, drip brewer, but in general these attempts have been unsatisfactory either because the devices were too expensive to produce or package, or unsatisfactory in use due to complexity of the device or lack of strength control to suit individual needs.

Summary of the invention

This invention is a throw-away device for instantly drip brewing coffee which can be produced, packaged, and sold at a reasonable price. Yet the device is at least as convenient to use as the currently available instant coffees, requiring no special equipment or appliances except a supply of hot water as is required for other instant coffees. Moreover, the device can be thrown away after a single use so that there is no mess nor any need to wash the device.

Basically the device includes an annular disc adapted to be supported on the upper lip of a coffee cup and having a pair of filters defining a chamber containing a measured quantity of ground coffee which is suspended a substantial distance below the disc by a side wall. The side wall and the upper filter form the boundaries of a pouring reservoir for receiving hot water to be dripped through the ground coffee. The side walls are flexible so that the packet of coffee can be inserted in the annulus of the disc resulting in a device which is only about as thick as the coffee packet for convenience in packaging.

When the device is removed from the package for use, the disc need only be set on the lip of the coffee cup and the coffee packet pushed down into the cup. Then hot water may be poured into the annulus of the disc immediately. Since the reservoir depends from the disc, the weight of the water and the ground coffee also tends to form and maintain the reservoir shape.

The device may be fabricated quite economically by the use of two nested filter cups with the ground coffee contained between the filter bottoms, and a pair of disc members connected above and below the flanges on the upper edges of the filter cups to suspend the filter cups from the disc. In one embodiment, the side wall of at least one filter cup is a thermoplastic sheet which is heat sealed to the disc and to the filter paper.

Since the packet of coffee extends down into the coffee cup, the packet is submerged when the cup is filled with liquid coffee. This structure finds further advantage in a method in accordance with this invention wherein the packet of ground coffee is left submerged in the beverage to steep if stronger coffee is desired. This method, thereby combines drip brewing with steeping, and permits accurate control of strength. Moreover, the disc may be grasped and oscillated vertically to recirculate the liquid coffee through the packet to increase the strength. This step is facilitated by the structure of the device wherein the disc is disposed above the water reservoir and can be grasped readily without danger of scalding the hands from hot water in the reservoir.

These and other objects, features and advantages of this invention will be apparent from the following detailed description when read with reference to the accompanying drawings.

Brief description of the drawings

FIGURE 1 is an exploded perspective view of a disposable drip brewing device constructed in accordance with this invention, showing the device in the unfolded or brewing position;

FIGURE 2 is a vertical section illustrating the device of FIGURE 1 in place on a coffee cup;

FIGURE 3 is a section view illustrating the device of FIGURE 1 in the collapsed or folded position suitable for packaging;

FIGURE 4 is a partial section illustrating a modified embodiment of the disposable drip brewer;

FIGURE 5 is a sectional view illustrating a plurality of the brewing devices packaged in a vacuum can; and FIGURE 6 is a sectional view illustrating a single brewing device packaged in foil.

Description of the preferred embodiments

Referring to FIGURES 1 and 2, the disposable drip brewer includes a pair of nested filter cups 2 and 4 defining a chamber containing a measured quantity of ground coffee 6; and an annular disc 8 fixed to the upper edge of the filter cups. The disc is adapted to be supported on the upper lip 9 of a coffee cup 10. A reservoir 12 formed by the upper filter cup 2 is adapted to receive hot water which then drips through the ground coffee into the coffee cup to make drip brewed liquid coffee 14. For convenience, the term "coffee" will sometimes be used herein to mean "ground coffee" and the term "beverage" will be used to mean "liquid coffee."

Each of the filter cups 2 and 4 includes a general upright side wall portion 2a and 4a and a bottom or filter portion 2b and 4b. A flange 2c and 4c extends outwardly from the upper edge of each side wall. In this embodiment, each of the filter cups 2 and 4 is composed entirely of a porous, cellulose material such as filter paper.

The disc 8 preferably is made up of a pair of superposed frusto-conical annular members 16 and 18 disposed above and below the flanges respectively. The disc members 16 and 18 are adhered together and to the flanges 2c and 4c to support the filter cups from the disc, for example, using a suitable glue.

In practice, if the outside diameter D of the disc is about four inches, and the inside diameter $d$ of the disc is about two and three-quarters inches, the disc will accommodate most of the commonly used cups. The disc preferably is sloped at an angle $\alpha$ of about 20 to 30 degrees with respect to the horizontal in order to center the disc on the cup lip. This slope also assures that hot water poured on the disc will run into the filter cup.

Preferably the size of the reservoir 12 and the porosity of the filter paper are selected so that the entire coffee cup may be filled from a single pour. In addition, the height of the reservoir preferably is sufficient that the packet of coffee is submerged when the cup is full of beverage. In this regard, it has been found convenient to make the depth of the reservoir $h$ approximately three-quarters of an inch.

Referring now to FIGURE 3, side walls 2a and 4a of the filter cups are flexible so that for purposes of packaging and shipping the device, the walls can be folded to permit the packet of coffee 6 to be inserted within the annulus 20 of the disc. It will be noted that in this position, the thickness $t$ of the entire device is no greater than the thickness of the coffee packet, so that a plurality of the devices can be packaged in a container quite efficiently. In order to decrease the time required for brewing, the packet of coffee preferably is of a diameter $p$ only slightly smaller than the inside diameter $d$ of the disc, for example, 2¼ inches. The thickness of the packet $t$ is preferably about one quarter of an inch in order to provide about 1/48 of a pound to 1/60 of a pound of coffee in the packet.

As shown in FIGURE 5, a plurality of the devices 3 folded to the configuration illustrated in FIGURE 3 may be packaged in a vacuum can 22, or, as illustrated in FIGURE 6, each may be individually packaged in a packet 23 of air tight material such as metallic foil. When it is desired to drip brew a cup of coffee, one of the devices is removed from the package and the disc 8 is placed on the upper lip 9 of a coffee cup 10, it being understood that the term coffee cup throughout this application refers to any appropriate container from which the beverage may be drunk. The packet 6 may be pushed downwardly with the finger to form the reservoir 12, or in some instances hot water may be poured immediately into the device relying on the force of the water to push the packet downward and form the reservoir. As the hot water fills the reservoir, it will drip through the packet of coffee 6 into the cup 10. Although the reservoir is considerably smaller than the volume of the coffee cup, water will be dripping through the filters 2 and 4 while the reservoir is being filled, so that at about the time the reservoir 12 is filled, sufficient water will have been poured to fill the cup 10.

The water dripping through the ground coffee will result in drip brewed coffee beverage coming out the bottom filter 4b and filling the cup. When the coffee cup is filled, the packet of coffee 6 will be submerged beneath the level $l$ of the beverage 14 in the cup. The disc 8 may be left in place for any desired length of time while the strength of the beverage is increased by additional dissolving action or steeping as the beverage circulates under the influence of the dripping action and thermal gradients. The steeping rate may be increased by grasping the outer edge 24 of the disc and oscillating the disc and packet vertically to recirculate the liquid through the coffee packet. When the packet is then held above the beverage level, the liquid will re-drip through the coffee packet giving a third brewing action.

After the beverage has reached the desired strength, the disc is removed by grasping it around the edge 24. It then may be discarded in the trash. The cup of coffee is ready for drinking without even the necessity of stirring with a spoon.

Referring now to the alternate embodiment illustrated in FIGURE 4, the side wall 102a of the upper filter cup 102 is formed of a sheet of thermoplastic film which is impervious to water, thereby insuring that all of the water poured into the reservoir drips through the packet of coffee 6 rather than a portion of the water going through the side wall 102a. Moreover, if the device is oscillated vertically to recirculate the water, it assures that the recirculation occurs through the packet of coffee rather than partially through the side wall 102a. The film 102a is heat sealed along its lower periphery 102d to a piece of filter paper 102b forming the upper filter, and the outer side of the film is heat sealed to the side wall 4a and flange 4c of the other filter cup 4. The flange 102c of the thermoplastic film extends beyond the flange 4c of the lower cup and is heat sealed to the disc members 16 and 18. Thus, the film connects the entire assembly together and keeps the packet 6 disc-shaped. Small ribs 26 may be formed on the underside of the lower disc member 18 at arcuately spaced locations to permit air to escape from the cup as the liquid enters.

From the above description, it can be seen the device of this invention provides an economical throw-away device for drip brewing one cup of coffee at a time—quickly, simply, and without any mess. The unique structure of the device, facilitates compact and economical packaging. No exterior or separate reservoir is required, although the device is readily adaptable to either. Moreover, the device lends itself to mass production because it is concentric about its vertical axis.

The use of filter cups which extend the packet of coffee beneath the beverage level permits the strength of the brewed coffee to be varied by varying the time interval, and permits the hydraulic oscillating action as a further method of increasing strength.

The filter paper permits the use of a very fine grind of coffee for fast and efficient brewing and has the further advantage of filtering out any foreign particles in the water.

While the invention has been described with reference to particular preferred embodiments, it should be understood that the scope of the invention should not be limited except in accordance with the following claims.

What is claimed is:
1. A disposable drip type coffee brewer comprising:
   upper and lower filters defining a chamber therebetween;
   a measured quantity of ground coffee disposed in the chamber;
   an annular disc adapted to be supported on the lip of a coffee cup; and
   a flexible wall depending from the disc and suspending the filters and coffee a substantial distance below the disc to define a water reservoir in a brewing position, said wall being adapted to collapse to a folded position in which the filters and a mass of coffee are disposed within the annulus of the disc for packaging and to unfold to the brewing position by application of a downward force on the filters to form the reservoir.
2. A disposable coffee brewer in accordance with claim 1 wherein the measured quantity of ground coffee forms a packet substantially larger in width than in thickness, and the entire brewer is about the same thickness as the packet of coffee when the wall is collapsed.
3. A disposable coffee brewer in accordance with claim 1 wherein the packet of ground coffee is disposed below the beverage level in the cup after the cup has been filled.
4. A disposable drip type coffee brewer in accordance with claim 1 wherein the wall is impervious to water.

5. A disposable drip type coffee brewer in accordance with claim 1 wherein the disc is above the entire water reservoir.

6. A disposable drip type coffee brewer in accordance with claim 1 wherein the device is collapsed to the folding position and individually contained in an air-tight packet.

7. A one cup disposable drip type coffee brewer comprising:
first and second superposed annular discs adapted to be supported on the lip of a coffee cup in a generally horizontal position;
a flexible wall having a flange portion held between the discs and an upright portion extending downwardly from the inner edge of the discs;
generally horizontal upper and lower filters at the bottom of the wall, the upper filter and the upright wall portion defining a reservoir for hot water; and
a measured quantity of ground coffee between the upper and lower filters to form a packet of ground coffee which fits within the annulus of the discs when the flexible wall is collapsed.

8. A disposable drip type coffee brewer comprising:
upper and lower filter cups each having a bottom filter portion and a flexible side wall portion, the upper filter cup being nested in the lower filter cup to define a chamber between the filter portions and a reservoir in the upper filter cup;
a measured quantity of ground coffee in the chamber;
an annular disc connected to the upper edge of each filter cup and adapted to be supported on the lip of a coffee cup so that the filters and ground coffee depend into the coffee cup; and
the annulus of the disc being large enough to receive the ground coffee for packaging when the flexible walls are folded.

9. A disposable drip type coffee brewer in accordance with claim 8 wherein the upper and lower cup-shaped members are each a porous cellulose material.

10. A one cup disposable drip type coffee brewer in accordance with claim 8 wherein the side wall portion of at least one cup-shaped member is a thermoplastic material heat sealed to the disc.

11. A disposable device for drip brewing one cup of coffee comprising:
upper and lower filter cups each having a generally circular bottom filter portion, an upright flexible side wall, and an outwardly extending flange at the upper edge of the side wall,
the upper filter cup being nested in the lower filter cup to define a chamber between the filter portions, and a reservoir in the upper filter cup;
a quantity of ground coffee disposed in the chamber to form a packet of coffee substantially coextensive with the bottom of the reservoir;
a frusto-conical annular disc connected to the flanges of the filter cups and adapted to be supported on the upper lip of a coffee cup with the filter cups extending downward into the coffee cup, and the disc sloping downward toward the reservoir, the disc including first and second disc members disposed above and below the filter cup flanges respectively and connected thereto; and
the side walls of the filter cups being adapted to collapse for packing the device with the packet of ground coffee disposed within the annulus of the disc and the entire device being no thicker than the packet.

12. A disposable device for drip brewing one cup of coffee in accordance with claim 11 wherein each filter cup is composed of filter paper.

13. A disposable device for drip brewing one cup of coffee in accordance with claim 11 wherein the side wall of at least one filter cup is a thermoplastic sheet heat sealed to the disc and to one of the filter portions.

14. A disposable device for drip brewing one cup of coffee in accordance with claim 11 wherein the device is collapsed and packaged individually in a foil packet.

15. A method of drip brewing coffee comprising the steps of:
placing on the upper lip of a coffee cup, an annular disc having at least one filter suspended from the disc by a wall to form a reservoir and ground coffee disposed on the filter;
pouring hot water into the reservoir to drip through the ground coffee and into the cup until the ground coffee is submerged in the beverage contained in the cup;
grasping the disc while the ground coffee is submerged and vertically reciprocating the disc to recirculate and re-drip the liquid coffee through the ground coffee;
leaving the ground coffee submerged in the liquid coffee in the cup until the liquid coffee reaches the desired strength; and
removing the disc and ground coffee from the cup.

16. A method of drip brewing coffee in accordance with claim 15 wherein the wall is watertight to force the hot water to pass through the ground coffee.

References Cited
UNITED STATES PATENTS

| | | | |
|---|---|---|---|
| 2,743,664 | 5/1956 | Dale | 99—295 |
| 2,822,273 | 2/1958 | Anderson | 99—295 |
| 2,885,290 | 5/1959 | Krasker | 99—77.1 |
| 3,083,101 | 3/1963 | Noury | 99—77.1 |

ROBERT W. JENKINS, *Primary Examiner.*

U.S. Cl. X.R.

99—295